(12) United States Patent
Kaplingat et al.

(10) Patent No.: US 11,442,894 B2
(45) Date of Patent: Sep. 13, 2022

(54) METHODS FOR SCALABLE FILE BACKUP CATALOGS AND DEVICES THEREOF

(71) Applicant: NetApp, Inc., Sunnyvale, CA (US)

(72) Inventors: Nikhil Bhavadas Kaplingat, Bangalore (IN); Ravindra Kuramkote, San Jose, CA (US); Amarnath Rachapudi, Bangalore (IN); Subhabrata Sen, Bangalore (IN)

(73) Assignee: NETAPP, INC., Sunnyvale, CA (US)

( * ) Notice: Subject to any disclaimer, the term of this patent is extended or adjusted under 35 U.S.C. 154(b) by 91 days.

(21) Appl. No.: 16/750,048

(22) Filed: Jan. 23, 2020

(65) Prior Publication Data

US 2021/0103555 A1 Apr. 8, 2021

Related U.S. Application Data

(60) Provisional application No. 62/909,369, filed on Oct. 2, 2019.

(51) Int. Cl.
*G06F 16/00* (2019.01)
*G06F 16/11* (2019.01)
(Continued)

(52) U.S. Cl.
CPC ........ *G06F 16/128* (2019.01); *G06F 11/1435* (2013.01); *G06F 11/1451* (2013.01);
(Continued)

(58) Field of Classification Search
CPC combination set(s) only.
See application file for complete search history.

(56) References Cited

U.S. PATENT DOCUMENTS

| 8,595,237 B1 * | 11/2013 | Chaudhary | G06F 16/14 |
| | | | 707/741 |
| 9,665,437 B2 * | 5/2017 | Bhargava | G06F 11/1446 |

(Continued)

OTHER PUBLICATIONS

International Search Report and Written Opinion for Corresponding PCT Application No. PCT/US20/53294, dated Jan. 13, 2021.

(Continued)

*Primary Examiner* — Farhan M Syed
(74) *Attorney, Agent, or Firm* — Troutman Pepper Hamilton Sanders LLP (Rochester)

(57) ABSTRACT

Methods, non-transitory machine readable media, and computing devices that provide file backup catalogs with improved scalability are disclosed. With this technology, a sequence number is incremented and an entry for a snapshot associated with obtained metadata for the snapshot is generated. The snapshot entry comprises a snapshot identifier for the snapshot and the incremented sequence number. A current version flag is then set in another entry for a file associated with a create event identified in the metadata. The file entry includes a file identifier for the file, a create attribute comprising the incremented sequence number, and a delete attribute. The file and snapshot entries are then inserted into indice(s) in a catalog database. Based on the schema of the indice(s), this technology provides a lightweight, elegant, and highly scalable catalog that more efficiently facilitates full path global file search and restore functionality with reduced resource utilization.

20 Claims, 6 Drawing Sheets

(51) Int. Cl.
*G06F 16/17* (2019.01)
*G06F 16/182* (2019.01)
*G06F 11/14* (2006.01)

(52) U.S. Cl.
CPC ...... *G06F 11/1461* (2013.01); *G06F 11/1464* (2013.01); *G06F 11/1469* (2013.01); *G06F 16/113* (2019.01); *G06F 16/1734* (2019.01); *G06F 16/1824* (2019.01); *G06F 2201/84* (2013.01)

(56) References Cited

U.S. PATENT DOCUMENTS

| | | | | |
|---|---|---|---|---|
| 9,766,825 | B2* | 9/2017 | Bhagi | G06F 3/0689 |
| 9,904,603 | B2* | 2/2018 | Mutalik | H04L 67/10 |
| 10,168,929 | B2* | 1/2019 | Bhagi | G06F 3/0665 |
| 10,884,634 | B2* | 1/2021 | Bhagi | G06F 11/3034 |
| 2012/0233172 | A1* | 9/2012 | Skillcorn | G06F 11/1448 707/E17.089 |
| 2015/0127804 | A1* | 5/2015 | Kripalani | H04L 67/1097 709/224 |
| 2015/0142745 | A1* | 5/2015 | Tekade | G06F 11/1464 707/646 |
| 2015/0142748 | A1* | 5/2015 | Gottemukkula | G06F 11/1461 707/649 |
| 2015/0142750 | A1* | 5/2015 | Mutalik | G06F 11/1464 707/654 |
| 2015/0143063 | A1* | 5/2015 | Mutalik | H04L 67/10 711/162 |
| 2015/0143064 | A1* | 5/2015 | Bhargava | G06F 11/1464 711/162 |
| 2015/0178167 | A1* | 6/2015 | Kulkarni | G06F 11/1446 707/649 |
| 2015/0212897 | A1* | 7/2015 | Kottomtharayil | G06F 16/128 714/20 |
| 2015/0286536 | A1* | 10/2015 | Klose | G06F 3/06 707/652 |
| 2016/0019117 | A1* | 1/2016 | Kumarasamy | G06F 9/4406 707/650 |
| 2016/0098323 | A1* | 4/2016 | Mutha | G06F 11/1402 707/654 |
| 2016/0314046 | A1* | 10/2016 | Kumarasamy | G06F 11/1435 |
| 2017/0024152 | A1* | 1/2017 | Bhagi | G06F 11/3034 |
| 2017/0169038 | A1* | 6/2017 | Borate | G06F 16/1873 |
| 2017/0178167 | A1 | 6/2017 | Tiwary et al. | |
| 2018/0129435 | A1* | 5/2018 | Bhagi | G06F 3/0689 |
| 2019/0087108 | A1* | 3/2019 | Bhagi | G06F 11/00 |
| 2021/0263802 | A1* | 8/2021 | Gottemukkula | H04L 67/10 |

OTHER PUBLICATIONS

International Preliminary Report on Patentability, dated Apr. 5, 2022.

\* cited by examiner

METHODS FOR SCALABLE FILE BACKUP CATALOGS AND DEVICES THEREOF

This application claims the benefit of U.S. Provisional Patent Application Ser. No. 62/909,369, filed on Oct. 2, 2019, which is hereby incorporated by reference in its entirety.

FIELD

This technology generally relates to data storage networks and, more particularly, to methods and devices for highly scalable file backup catalogs that facilitate efficient search and restore functionality, for example.

BACKGROUND

Data storage networks are increasingly utilized to store large amounts of data across different performance tiers in a durable manner. Managing a large number of files in unstructured storage in relatively large volumes in a way that facilitates quick data retrieval, as well as efficient recovery in response to a failure event, is challenging. The challenge is particularly acute for long term backup storage tiers like tape and cloud object storage.

Catalogs of files or backup metadata are generally utilized to provide search, versioning, and restore functionality for backup storage tiers. Unfortunately, current file backup catalogs are not sufficiently scalable and do not facilitate efficient search of file storage. Additionally, current file backup catalogs do not efficiently and effectively support large data change rates, resulting in increased resource utilization for backup storage devices.

DETAILED DESCRIPTION

Examples of the technology described and illustrated herein provide a highly scalable schema for object or file catalogs that can be used to manage search and restore functionality for relatively large volumes of data. The schema utilizes snapshot-mapping and object-mapping indices that store a minimal amount of information required to easily identify particular backup file(s) or object(s) that may be responsive to a search request or part of a snapshot requiring restoration. The schemas leverage incremented snapshot sequence numbers to manage versioning and facilitate a technical improvement of faster response time for file or object search and restoration.

The catalog database also requires reduced memory allocation that facilitates increased scalability and provides full path global file search and restore functionality with reduced resource utilization. Accordingly, this technology provides an improvement to the functioning of data storage devices by requiring fewer resources to manage and maintain a backup object catalog, as well as process and respond to search and restoration requests from storage administrators, for example. Advantageously, the technology described and illustrated by way of the examples herein also provide an improvement in data protection and data lifecycle management technology based on an improved, durable, and highly scalable backup object catalog.

Figure 1:
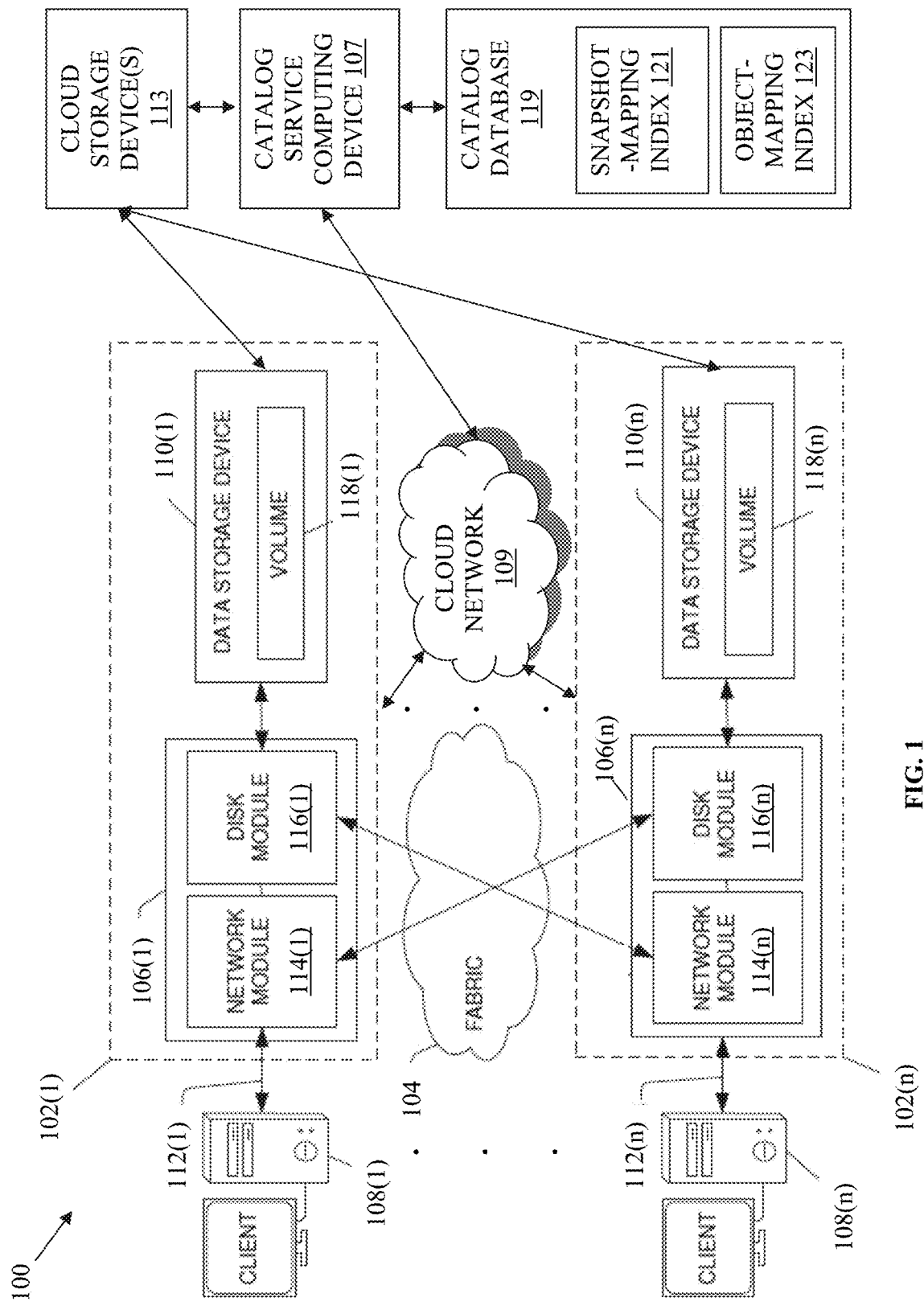
FIG. 1 is a block diagram of a network environment with exemplary host computing devices.

A clustered network environment 100 that may implement one or more aspects of the technology described and illustrated herein is shown in FIG. 1. The clustered network environment 100 includes host computing devices 102(1)-102(n) that are coupled over a cluster or data fabric 104 that includes one or more communication network(s) and facilitates communication between the host computing devices 102(1)-102(n) (and one or more modules, components, etc. therein, such as, nodes 106(1)-106(n), for example), although any number of other elements or components can also be included in the clustered network environment 100 in other examples. The host computing device 102(1)-102(n) are further coupled to a catalog service computing device 107 via a cloud network 109. This technology provides a number of advantages including methods, non-transitory computer readable media, and computing devices that provide improved, scalable file backup catalogs that facilitate more efficient file search and restore functionality.

In this example, nodes 106(1)-106(n) of the host computing devices 102(1)-102(n) can be primary or local storage controllers or secondary or remote storage controllers that provide client devices 108(1)-108(n) with access to data stored within data storage devices 110(1)-110(n). The host computing devices 102(1)-102(n) of the examples described and illustrated herein are not limited to any particular geographic areas and can be clustered locally and/or remotely. Thus, in one example the host computing devices 102(1)-102(n) can be distributed over a plurality of storage systems located in a plurality of geographic locations; while in another example a clustered network can include host computing devices 102(1)-102(n) residing in a same geographic location (e.g., in a single on-site rack).

In the illustrated example, one or more of the client devices 108(1)-108(n), which may be, for example, personal computers (PCs), computing devices used for storage (e.g., storage servers), or other computers or peripheral devices, are coupled to the respective host computing devices 102(1)-102(n) by network connections 112(1)-112(n). Network connections 112(1)-112(n) may include a local area network (LAN) or wide area network (WAN), for example, that utilize Network Attached Storage (NAS) protocols, such as a Common Internet Filesystem (CIFS) protocol or a Network Filesystem (NFS) protocol to exchange data packets, a Storage Area Network (SAN) protocol, such as Small Computer System Interface (SCSI) or Fiber Channel Protocol (FCP), an object protocol, such as simple storage service (S3), and/or non-volatile memory express (NVMe), for example.

Illustratively, the client devices 108(1)-108(n) may be general-purpose computers running applications and may interact with the host computing devices 102(1)-102(n) using a client/server model for exchange of information. That is, the client devices 108(1)-108(n) may request data from the host computing devices 102(1)-102(n) (e.g., data on one of the data storage devices 110(1)-110(n) or the cloud storage device(s) 113 managed by a network storage controller configured to process I/O commands issued by the client devices 108(1)-108(n)), and the host computing devices 102(1)-102(n) may return results of the requests to the client devices 108(1)-108(n) via the network connections 112(1)-112(n).

While the host computing devices 102(1)-102(n) are disclosed in this example as including only data storage devices 110(1)-110(n) for storage, other types of mass storage devices including hard disk drives (HDDs), magnetic disk drives, and any other similar media adapted to store information, including, for example, data, metadata, and/or parity information, can also be utilized by the host computing devices 102(1)-102(n) in other examples.

The nodes 106(1)-106(n) can include network or host nodes that are interconnected as a cluster to provide data storage and management services, such as to an enterprise having remote locations, cloud storage, etc., for example. Such nodes 106(1)-106(n) can be attached to the fabric 104 at a connection point, redistribution point, or communication endpoint, for example. One or more of the host computing devices 106(1)-106(n) may be capable of sending, receiving, and/or forwarding information over a network communications channel, and could comprise any type of device that meets any or all of these criteria.

In an example, the nodes 106(1) and 106(n) may be configured according to a disaster recovery configuration whereby a surviving takeover node provides switchover access to the data storage devices 110(1)-110(n) in the event a failure or planned takeover event occurs (e.g., the node 106(1) provides client device 108(n) with switchover data access to data storage device 110(1)). Additionally, while two nodes and host computing devices are illustrated in FIG. 1, any number of nodes or host computing devices can be included in the clustered network environment 100 other examples in other types of configurations or arrangements.

As illustrated in the clustered network environment 100, nodes 106(1)-106(n) can include various functional components that coordinate to provide distributed storage architecture. For example, the nodes 106(1)-106(n) can include network modules 114(1)-114(n) and disk modules 116(1)-116(n). Network modules 114(1)-114(n) can be configured to allow the nodes 106(1)-106(n) (e.g., network storage controllers) to connect with client devices 108(1)-108(n) over the storage network connections 112(1)-112(n), for example, allowing the client devices 108(1)-108(n) to access data stored in the clustered network environment 100.

Further, the network modules 114(1)-114(n) can provide connections with one or more other components through the cluster fabric 104. For example, the network module 114(1) of node 106(1) can access the data storage device 110(n) by sending a request via the cluster fabric 104 through the disk module 116(n) of node 106(n). The cluster fabric 104 can include one or more local and/or wide area computing networks embodied as Infiniband, Fibre Channel (FC), or Ethernet networks, for example, although other types of networks supporting other protocols can also be used.

In some examples, the disk modules 116(1)-116(n) can be configured to connect the data storage devices 110(1)-110(n) to the nodes 106(1)-106(n) via a PCIe bus. In these examples, the disk modules 116(1)-116(n) communicate with the data storage devices 110(1)-110(n) according to Fabric protocols, such as NVMe, for example, although other protocols can also be used. Thus, as seen from an operating system on node computing devices 106(1)-106(n), the data storage devices 110(1)-110(n) can appear as locally attached. In this manner, different nodes 106(1)-106(n) may access data blocks, files, or objects through the operating system, rather than expressly requesting abstract files.

While the clustered network environment 100 illustrates an equal number of network modules 114(1)-114(n) and disk modules 116(1)-116(n), other examples may include a differing number of these modules. For example, there may be a plurality of network and disk modules interconnected in a cluster that do not have a one-to-one correspondence between the network and disk modules. That is, different nodes can have a different number of network and disk modules, and the same node can have a different number of network modules than disk modules.

Further, one or more of the client devices 108(1)-108(n) can be networked with the nodes 106(1)-106(n) in the cluster, over the storage connections 112(1)-112(n). As an example, respective client devices 108(1)-108(n) that are networked to a cluster may request services (e.g., exchanging of information in the form of data packets) of nodes 106(1)-106(n) in the cluster, and the nodes 106(1)-106(n) can return results of the requested services to the client devices 108(1)-108(n). In one example, the client devices 108(1)-108(n) can exchange information with the network modules 114(1)-114(n) residing in the node computing devices 106(1)-106(n) (e.g., network hosts) in the host computing devices 102(1)-102(n).

In one example, the host computing devices 102(1)-102(n) host aggregates corresponding to physical local and/or remote data storage devices, such as flash media in the data storage devices 110(1)-110(n), for example. One or more of the data storage devices 110(1)-110(n) can include mass storage devices, such as disks of a disk array. In this particular example, the data storage devices 110(1)-110(n) are solid state drives (SSDs) that include device memory hosting controller firmware (e.g., dynamic random access memory (DRAM)) and flash media, although other types of data storage devices can also be used in other examples.

The aggregates in this example include volumes 118(1)-118(n), which are virtual data stores or storage objects that define an arrangement of storage and one or more filesystems within the clustered network environment 100. Volumes 118(1)-118(n) can span a portion of a disk or other storage device, a collection of disks, or portions of disks, for example, and typically define an overall logical arrangement of data storage. In one example, volumes 118(1)-118(n) can include stored user data as one or more files, blocks, or objects that reside in a hierarchical directory structure within the volumes 118(1)-118(n).

Volumes 118(1)-118(n) are typically configured in formats that may be associated with particular storage systems, and respective volume formats typically comprise features that provide functionality to the volumes 118(1)-118(n), such as providing the ability for volumes 118(1)-118(n) to form clusters, among other functionality. Optionally, one or more of the volumes 118(1)-118(n) can be in composite aggregates and can extend between one or more of the SSDs 110(1)-110(n) and, optionally, one or more of the cloud storage device(s) 113 to provide tiered storage, for example, and other arrangements can also be used in other examples.

To facilitate access to data stored on the data storage devices 110(1)-110(n), a filesystem may be implemented that logically organizes the information as a hierarchical structure of directories and files. In this example, respective files may be implemented as a set of disk blocks of a particular size that are configured to store information, whereas directories may be implemented as specially formatted files in which information about other files and directories are stored.

Data can be stored as files or objects within a physical volume and/or a virtual volume, which can be associated with respective volume identifiers. The physical volumes correspond to at least a portion of physical storage devices, such as the data storage devices 110(1)-110(n) (e.g., a Redundant Array of Independent (or Inexpensive) Disks (RAID system)) whose address, addressable space, location, etc. does not change. Typically the location of the physical volumes does not change in that the range of addresses used to access it generally remains constant.

Virtual volumes, in contrast, can be stored over an aggregate of disparate portions of different physical storage devices. Virtual volumes may be a collection of different available portions of different physical storage device locations, such as some available space from disks, for example. It will be appreciated that since the virtual volumes are not "tied" to any one particular storage device, virtual volumes can be said to include a layer of abstraction or virtualization, which allows it to be resized and/or flexible in some regards.

Further, virtual volumes can include one or more logical unit numbers (LUNs), directories, Qtrees, files, and/or other storage objects, for example. Among other things, these features, but more particularly the LUNs, allow the disparate memory locations within which data is stored to be identified, for example, and grouped as data storage unit. As such, the LUNs may be characterized as constituting a virtual disk or drive upon which data within the virtual volumes is stored within an aggregate. For example, LUNs are often referred to as virtual drives, such that they emulate a hard drive, while they actually comprise data blocks stored in various parts of a volume.

In an example, the cloud storage device(s) 113 can be a server computing device or any other type of storage device configured to store large quantities of files or objects at the direction of the catalog service computing device 107 and/or host computing devices 102(1)-102(n). In particular, the cloud storage device(s) 113 can be leveraged as a long term storage tier that stores backup versions of files stored on, or migrated from, the data storage devices 110(1)-110(n). In an example, the host computing devices 102(1)-102(n) can generate snapshots of files maintained on the data storage devices 110(1)-110(n), which are stored, along with associated metadata, on the cloud storage device(s) 113.

Figure 2:
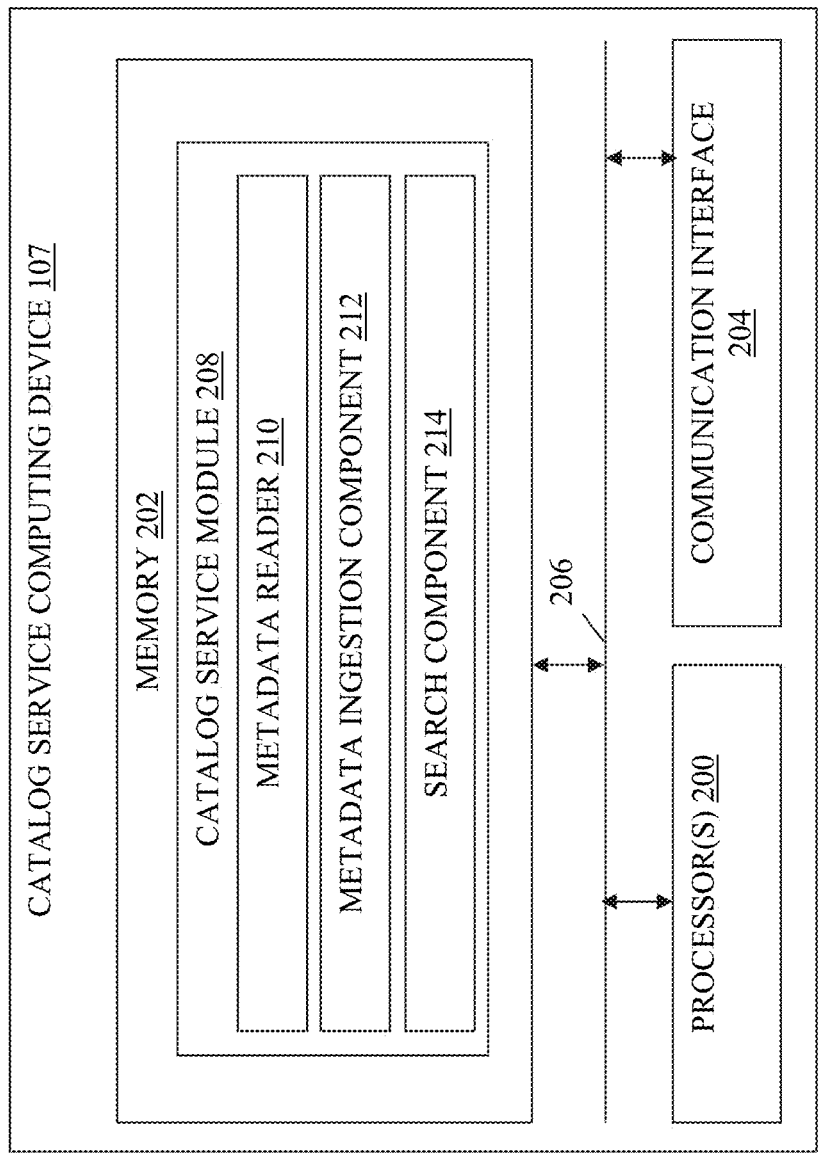
FIG. 2 is a block diagram of an exemplary catalog service computing device of FIG. 1.

Referring to FIG. 2, the catalog service computing device 107 is coupled to the cloud storage device(s) 113 and, via the cloud network 109, the host computing device 102(1)-102(n). The catalog service computing device 107 in this example includes processor(s) 200, a memory 202, and a communication interface 204, which are all coupled together by a bus 206 or other communication link, although the cloud storage device(s) 113 can have other types and numbers of components or other elements. The catalog service computing device 107 can be a standalone device or integrated with one or more other devices or apparatuses, such as the catalog database 119 and/or the cloud storage device(s) 113, for example.

The processor(s) 200 of the catalog service computing device 107 may execute programmed instructions stored in the memory 202 for the any number of the functions described and illustrated herein. The processor(s) 200 may include one or more CPUs or general purpose processors with one or more processing cores, for example, although other types of processor(s) can also be used.

The memory 202 of the catalog service computing device 107 stores these programmed instructions for one or more aspects of the present technology as described and illustrated herein, although some or all of the programmed instructions could be stored elsewhere. A variety of different types of memory storage devices, such as random access memory (RAM), read only memory (ROM), hard disk, solid state drives, flash memory, or other computer readable medium which is read from and written to by a magnetic, optical, or other reading and writing system that is coupled to the processor(s) 200, can be used for the memory 202.

Accordingly, the memory 202 of the catalog service computing device 107 can store application(s) that can include executable instructions that, when executed by the processor(s) 200, cause the catalog service computing device 107 to perform actions, such as to transmit, receive, or otherwise process network messages, for example, and to perform other actions described and illustrated by way of the examples herein. The application(s) can be implemented as modules or components of other application(s). Further, the application(s) can be implemented as operating system extensions, module, plugins, or the like.

Even further, the application(s) may be operative in a cloud-based computing environment. The application(s) can be executed within or as virtual machine(s) or virtual server(s) that may be managed in a cloud-based computing environment. Also, the application(s), and even the catalog service computing device 107 itself, may be located in virtual server(s) running in a cloud-based computing environment rather than being tied to one or more specific physical network computing devices. Also, the application(s) may be running in one or more virtual machines (VMs) executing on the catalog service computing device 107. Additionally, in one or more embodiments of this technology, virtual machine(s) running on the catalog service computing device 107 may be managed or supervised by a hypervisor.

In this particular example, the memory 202 of the catalog service computing device 107 includes a catalog service module 208, which interfaces with the catalog database 119 to maintain and utilize the snapshot-mapping index 121 and object-mapping index 123 maintained therein. The catalog service module 214 ingests and processes snapshot metadata to generate and update the contents of the snapshot-mapping index 121 and object-mapping index 123 following notification that a snapshot has been created by one of the host computing devices 102(1)-102(n). The catalog service module 214 in this particular example includes a metadata reader 210, a metadata ingestion component 212, and a search component 214, although other types of components and/or modules can also be included in other examples.

The metadata reader 210 reads raw snapshot metadata from the cloud storage device(s) 113. The metadata ingestion component transforms the raw snapshot metadata, such as to an Elasticsearch-based schema, for example. Additionally, the search component 214 provides various search functionality for files, file versions, and their associated snapshots, for example. The catalog service module 208 utilizes the catalog database 119 to service search requests from the client devices 108(1)-108(n) and provide restore functionality, as described and illustrated in more detail later with reference to FIG. 6.

The communication interface 204 of the catalog service computing device 107 operatively couples and communicates between the catalog service computing device 107, the host computing devices 102(1)-102(n), the catalog database 119, and/or the cloud storage devices 113, which are all coupled together by one or more communication networks including the cloud network 109, although other types and/or numbers of communication networks or systems with other types and/or numbers of connections and/or configurations to other devices and/or elements can also be used.

By way of example only, the cloud network(s) 109 can include wide area network(s) (WAN(s)), and can use TCP/IP over Ethernet and industry-standard protocols, although other types and/or numbers of protocols and/or communication networks can be used. The cloud network(s) 109 in this example can employ any suitable interface mechanisms and network communication technologies including, for example, Ethernet-based Packet Data Networks (PDNs) and the like.

In examples in which the catalog database 119 is a standalone device, the catalog database 119 includes a processor, a memory, and a communication interface, which are all coupled together by a bus or other communication link, although the catalog database 119 can have other types and numbers of components or other elements. In one example, the catalog database 119 hosts an Elasticsearch cluster implementation, although other types of databases can also use. While the catalog database 119 is illustrated in FIG. 1 as in communication with only host computing device 102(1)-102(n) via only one catalog service computing device 107, the catalog database 119 can be coupled to any number of host computing device and/or catalog service computing devices via any number of communication networks in a clustered, distributed deployment in other examples.

In this particular example, the catalog database 119 hosts a snapshot-mapping index 121 and an object-mapping index 123, although the indices can be combined or additional indices can also be utilized in other examples. The snapshot-mapping index 121 in this example stores an index of metadata for snapshots hosted on the cloud storage device(s) 113 according to a particular schema described and illustrated in more detail later. The object-mapping index 123 stores an index of metadata for the files associated with the snapshots indexed in the snapshot-mapping index 121. The file metadata is stored according to a particular schema that is also described and illustrated in more detail later.

Referring back to FIG. 1, each of the host computing devices 102(1)-102(n) in this particular example includes processor(s), a memory, a network adapter, a cluster access adapter, and a storage adapter interconnected by a system bus (e.g., a PCIe bus). Each of the host computing devices 102(1)-102(n) also includes applications including a storage operating system installed in the memory that can, for example, implement a RAID data loss protection and recovery scheme to optimize reconstruction of data of a failed disk or drive of the data storage devices 110(1)-110(n). In some examples, the host computing device 102(n) is substantially the same in structure and/or operation as host computing device 102(1), although the host computing device 102(n) can also include a different structure and/or operation in one or more aspects than the host computing device 102(1).

The network adapter in this example includes the mechanical, electrical and signaling circuitry needed to connect each of the host computing devices 102(1)-102(n) to one or more of the client devices 108(1)-108(n) over network connections 112(1)-112(n), which may comprise, among other things, a point-to-point connection or a shared medium, such as a local area network. In some examples, the network adapter further communicates (e.g., using TCP/IP) via the cluster fabric 104 and/or another network (e.g. a WAN) with cloud storage device(s) 113 to process storage operations associated with data stored thereon.

The storage adapter cooperates with the storage operating system executing on each of the host computing devices 102(1)-102(n) to access information requested by the client devices 108(1)-108(n) (e.g., to access data on the SSD 110(1)). In some examples, the data storage devices 110(1)-110(n) stores a cache for data maintained on one or more other data storage devices (not shown) coupled to each of the host computing devices 102(1)-102(n). The data maintained on the other data storage devices may be stored on any type of attached array of writeable media such as magnetic disk drives, flash memory, and/or any other similar media adapted to store information.

In the data storage devices 110(1)-110(n), information can be stored in data blocks. The storage adapter can include I/O interface circuitry that couples to the data storage devices 110(1)-110(n) over an I/O interconnect arrangement, such as a storage area network (SAN) protocol (e.g., Small Computer System Interface (SCSI), Internet SCSI (iSCSI), hyperSCSI, Fiber Channel Protocol (FCP)). Information retrieved by the storage adapter and can be processed by the processor(s) (or the storage adapter itself) prior to being forwarded over the system bus to the network adapter (and/or the cluster access adapter if sending to another node in the cluster) where the information is formatted into a data packet and returned to a requesting one of the client devices 108(1)-108(n) and/or sent to another node attached via the cluster fabric 104.

In some examples, a storage driver in the storage operating system interfaces with the storage adapter to facilitate interactions with the data storage devices 110(1)-110(n). In particular, the storage driver is used to communicate device commands and read/write requests to SSDs using the NVMe protocol in some examples. More specifically, the storage driver in this example communicates command requests to a controller of an SSD to execute read/write storage operations on flash media (e.g., not-and (NAND) flash memory). The storage driver further communicates with upper layers of a storage stack, which receive and process requests from applications, which may be executing on the client devices 108(1)-108(n), for example.

The storage operating system in this example can also manage communications for each of the host computing devices 102(1)-102(n) among other devices that may be in a clustered network. Thus, the host computing device 102(1) can respond to client requests to manage data on the data storage devices 110(1)-110(n) or other data storage devices in accordance with the client requests.

In some examples, the storage operating system includes a file system module (not shown) that can establish and manage one or more filesystems including software code and data structures that implement a persistent hierarchical namespace of files and directories, for example. As an example, when a new data storage device (not shown) is added to a clustered network system, the file system module is informed where, in an existing directory tree, new files associated with the new data storage device are to be stored. This is often referred to as "mounting" a filesystem.

In the example host computing devices 102(1)-102(n), the memory can include storage locations that are addressable by the processor(s) and adapters and for storing related software application code and data structures. The processor(s) and adapters may, for example, include processing elements and/or logic circuitry configured to execute the software code and manipulate the data structures.

The storage operating system also invokes storage operations in support of a file service implemented by each of the host computing devices 102(1)-102(n). Other processing and memory mechanisms, including various computer readable media, may be used for storing and/or executing application instructions pertaining to the techniques described and illustrated herein. For example, the storage operating system can also utilize one or more control files (not shown) to aid in the provisioning of virtual machines.

The examples of the technology described and illustrated herein may be embodied as one or more non-transitory computer readable media (e.g., memory) having machine or processor-executable instructions stored thereon for one or more aspects of the present technology, which when executed by one or more processors (e.g., processor(s) 200), cause the processors to carry out the steps necessary to implement the methods of this technology, as described and illustrated with the examples herein. In some examples, the executable instructions are configured to perform one or more steps of a method, such as one or more of the exemplary methods described and illustrated later with reference to FIGS. 3-6, for example.

Figure 3:
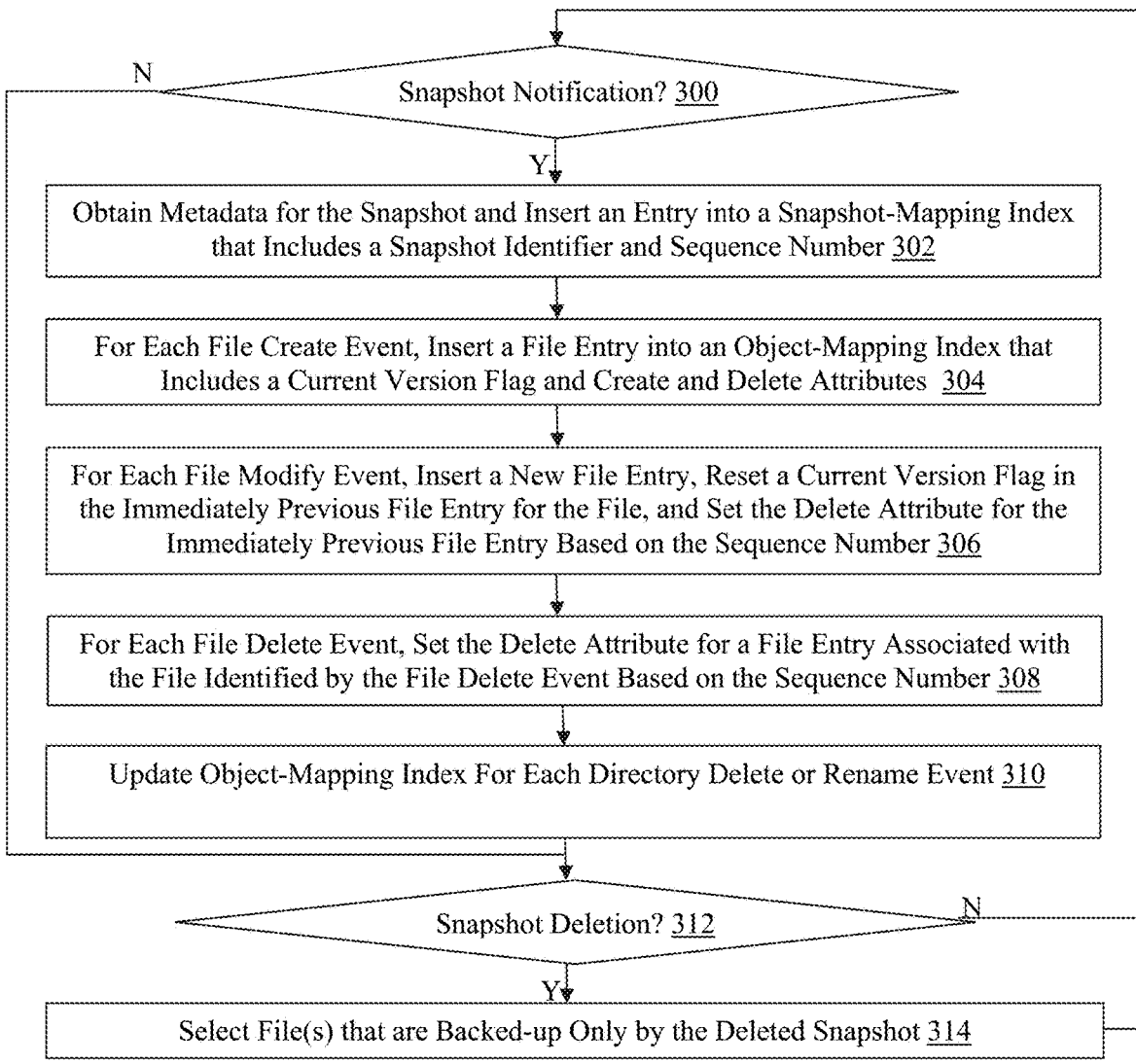
FIG. 3 is a flowchart of an exemplary method for implementing scalable file backup catalogs.
Figure 4:
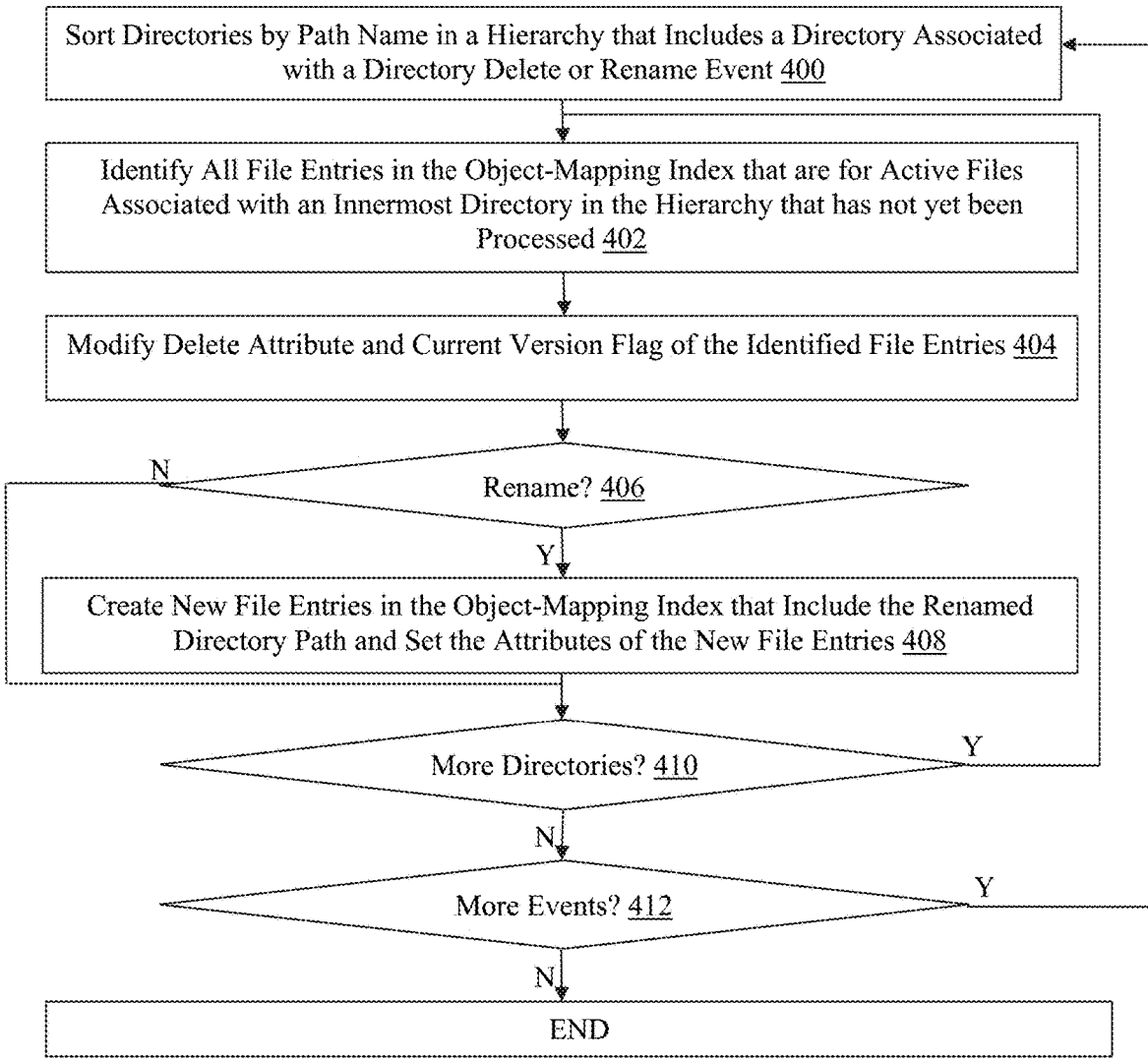
FIG. 4 is a flowchart of an exemplary method for processing directory deletion or renaming events.
Figure 5:
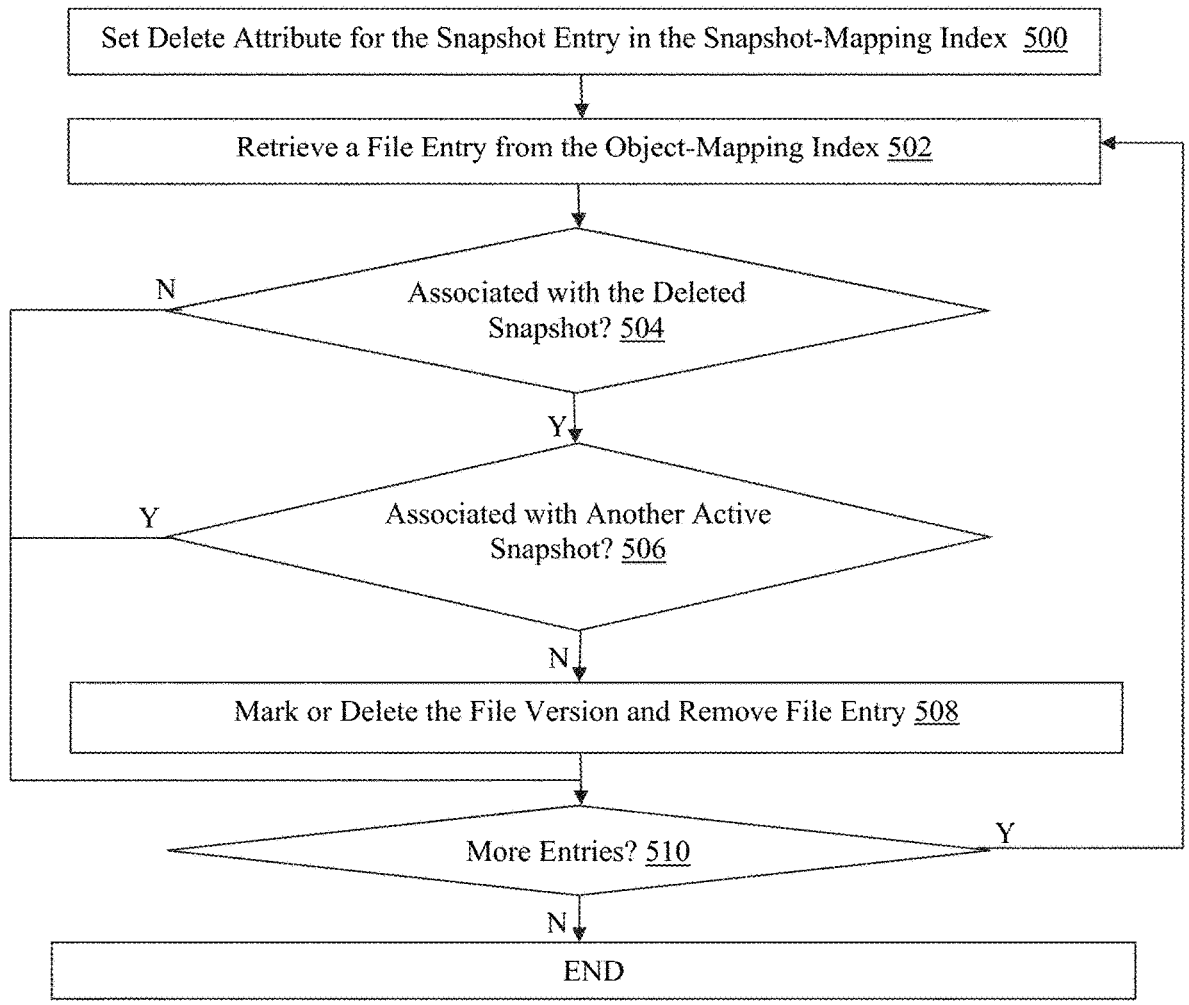
FIG. 5 is a flowchart of an exemplary method for processing snapshot deletions.

Referring to FIG. 3, a flowchart illustrating an exemplary method for implementing scalable file backup catalogs is illustrated. In step 300 in this example, the catalog service module 214 of the catalog service computing device 107 determines whether a snapshot notification has been received from one of the host computing device 102(1)-102 (*n*). The snapshot notification indicates that a snapshot was generated by the operating system and stored, along with associated snapshot metadata, in the cloud storage device(s) 113, although the snapshots and/or snapshot metadata could also be stored elsewhere. If the catalog service computing device 107 determines that a snapshot notification has been received, then the Yes branch is taken to step 302.

In step 302, the catalog service module 214 of the catalog service computing device 107 obtains metadata for the snapshot associated with the received notification. The catalog service computing device 107 then inserts an entry into the snapshot-mapping index 121 stored in the catalog database 119. The entry includes at least a unique identifier, such as a snapshot name or universally unique identifier (UUID) included in the snapshot metadata, and a sequence number.

In one example, the catalog service computing device 107 maintains the current sequence number in the memory 202 and increments the sequence number for each new snapshot for which associated metadata is obtained, although other methods for storing and generating the sequence number can also be used. Optionally, the snapshot entry can also include one or more of an indication of the associated volume or a creation time, for example, and other contents of the obtained metadata can also be stored in the snapshot entry.

In step 304, the catalog service module 214 of the catalog service computing device 107 inserts a file entry into the object-mapping index 123 in the catalog database 119 for each file associated with a file create event identified in the snapshot metadata obtained in step 302. For an initial snapshot of a volume, all of the file events will be create events, but the snapshot metadata for subsequent, incremental snapshots can include file modify and/or delete events, which are processed as described later with reference to steps 308 and 310, respectively.

The file entries inserted in step 304 include at least a current version flag and create and delete attributes, although other types of attributes and information can also be included such as a full path for the associated file and/or volume and/or cluster UUIDs. The current version flag indicates whether the file entry represents the latest or current version of the associated file. Upon initial ingestion, the current version flag is set for each new file entry.

The create attribute corresponds with the sequence number of the snapshot in which the associated file was first included. Accordingly, upon initial ingestion, each new file entry will include a create attribute of "1" in examples in which the sequence numbers for the snapshots begin at 1 and are monotonically increasing. Each new file entry in this example also includes a delete attribute that corresponds with the sequence number of the snapshot in which a delete event was included for the associated file. Since upon initial ingestion, no files will have been deleted, the new file entries optionally include a default value or sequence number, such as "−1".

Accordingly, in one particular example in which a file "f1" is created in snapshot S1 having a sequence number of "1", the following entries can be inserted into the snapshot-mapping index 121 and object mapping index 123, respectively:
Snapshot-mapping
  Snapshotname: S1
  Sequence Number: 1
Object-mapping:
  File name: f1
  SnapshotCreateSequence: 1
  SnapshotDeleteSequence: −1
  Current_Version: Y In other examples, additional information extracted from the snapshot metadata can be included in one or more of the file entries generated and inserted in step 304 such as a full file path, a file size, an associated user and/or group, a modification time, a creation time, or an indication of an associated inode, for example.

In step 306, the catalog service module 214 of the catalog service computing device 107 identifies each file modify event in the snapshot metadata obtained in step 302. File modify events will only be included in snapshot metadata for snapshots obtained for a volume subsequent to an initial snapshot. For each of the identified file modify events, the catalog service computing device 107 inserts a new file entry for the associated file and modifies the immediately previous file entry for the file in the object-mapping index 123.

The new file entry is generated and inserted as described in detail earlier with reference to step 304. The immediately previous entry that is modified has the same unique identifier (e.g., file name or path) and a current version flag indicating that it corresponds with the current version of the file. Since the file has been modified in the current snapshot, the catalog service computing device 107 resets the current version flag, and sets the delete attribute of the immediate previous entry, based on the sequence number generated for the current snapshot. Accordingly, file modify events are treated like a combination of file create and file delete events. Exemplary file entries resulting from an exemplary file create event are illustrated below:
(Updated entry):
File name: f1
SnapshotCreateSequence: 1
SnapshotDeleteSequence: 2 (updated)
Current Version: N (updated)
(Newly-inserted entry):
File name: f1
SnapshotCreateSequence: 2
SnapshotDeleteSequence: −1
Current Version: Y In step 308, the catalog service module 214 of the catalog service computing device 107 identifies each file delete event in the snapshot metadata obtained in step 302. File delete events will only be included in snapshot metadata for snapshots obtained for a volume subsequent to an initial snapshot. For each of the identified file delete events, the host computing device 102(1) sets the delete attribute for the file entry associated with the current version of the associated file based on the sequence number of the current snapshot. Accordingly, in the example illustrated earlier, if the file "f1" is deleted in the snapshot "s3" that has a sequence number of "3" the file entry for the current version of the file is modified as follows:

Catalog-object-mapping:
    File name: f1
    SnapshotCreateSequence: 1
    SnapshotDeleteSequence: 3 (updated)
    Current_Version: Y In step 310, the catalog service module 214 of the catalog service computing device 107 updates the object-mapping index 123 for each directory delete or rename event in the snapshot metadata obtained in step 302. Directory delete or rename events will only be included in snapshot metadata for snapshots obtained for a volume subsequent to an initial snapshot. An exemplary method for processing directory deletion or renaming events by the catalog service computing device 107 is illustrated in more detail in FIG. 4.

In step 400, the catalog service module 214 of the catalog service computing device 107 sorts directories in a hierarchy that includes at least one directory associated with a delete or rename event identified in the snapshot metadata obtained in step 302. The directories are sorted by path name and the file entries in the object-mapping index 12 include the path name for the associated files in this example. Sorting the directories ensures that if multiple directories in the same hierarchy are deleted or renamed, then the inner-most directory is processed before the outermost directories.

In step 402, the catalog service module 214 of the catalog service computing device 107 identifies all file entries in the object-mapping index 123 that are for active files associated with an innermost directory in the hierarchy that has not yet been processed. The innermost directory can be identified based on the sorting and a correlation with the path information in the file entries, for example. The active files can be identified based on the value of the delete attributes (e.g., a default value such as a SnapshotDeleteSequence number with value −1) in the corresponding entry of the object-mapping index 123, although the directory and file entries can be identified in other ways in other examples.

In step 404, the catalog service module 214 of the catalog service computing device 107 modifies the delete attributes of the file entries identified in step 402. The delete attributes are modified by replacing the current value (e.g., a default value) with the sequence number of the current snapshot.

In step 406, the catalog service module 214 of the catalog service computing device 107 determines whether the event associated with the directory currently being processed is a directory rename event, such as by a name or other indication associated with the event in the snapshot metadata. If the catalog service computing device 107 determines that the event is a rename event, then the Yes branch is taken to step 408.

In step 408, the catalog service module 214 of the catalog service computing device 107 creates new file entries in the object-mapping index 123 that correspond to each of the file entries identified in step 402 but include the renamed directory path. The catalog service computing device 107 also sets the attributes of the newly-created file entries. In this example, the create attribute is set based on the sequence number of the current snapshot, the delete attribute is set based on a default value, and the current version flag is set to indicate that the file entries represent the latest or current entries for the associated files. Subsequent to creating the new file entries, or if the catalog service computing device 107 determines in step 406 that the event is a directory delete event, and not a directory rename event, and the No branch is taken, then the catalog service computing device 107 proceeds to step 410.

In step 410, the catalog service module 214 of the catalog service computing device 107 determines whether there are more directories in the hierarchy that are between the directory processed in steps 402-408 and the directory associated with the delete or rename event. If the catalog service computing device 107 determines there are more directories, then the Yes branch is taken back to step 402. However, if the catalog service computing device 107 determines there are no more directories, then the No branch is taken to step 412.

In step 412, the catalog service module 214 of the catalog service computing device 107 determines whether there are more directory delete or rename events identified in the snapshot metadata obtained in step 302. If the catalog service computing device 107 determines that there are more directory delete or rename event(s), then the Yes branch is taken to step 400. However, if the catalog service computing device 107 determines that there are no more directory delete or rename events, then the No branch is taken, the process ends, and the catalog service computing device 107 proceeds to step 312 of FIG. 3.

In step 312, the catalog service module 214 of the catalog service computing device 107 determines whether a snapshot deletion has been initiated. In one example, the catalog service module 214 can receive another notification from the operating system that indicates that a snapshot has been deleted whether manually or automatically by a scheduler, for example, although other methods for determining whether a snapshot has been deleted can also be used. If the catalog service computing device 107 determines that a snapshot has been deleted, then the Yes branch is taken to step 314.

In step 314, the catalog service module 214 of the catalog service computing device 107 selected files for deletion that are backed-up only by the snapshot being deleted (i.e., file(s) that are not associated with another snapshot). An exemplary method for processing snapshot deletions by the catalog service computing device 107 is illustrated in more detail in FIG. 5.

In step 500, the catalog service module 214 of the catalog service computing device 107 sets a delete attribute in a snapshot entry in the snapshot mapping index 121 that corresponds to the snapshot being deleted. The delete attribute in some examples can be a flag that is set when an associated snapshot is deleted. The catalog service computing device 107 can identify the snapshot entry in the snapshot mapping index 121 based on a correlation of a snapshot sequence number in the notification received in step 312 of FIG. 3, for example.

In step 502, the catalog service computing device 107 retrieves a file entry from the object-mapping index 123. In some examples, a scheduler optionally executes periodically to select the file(s) for deletion, as described and illustrated below with reference to steps 504-510. In other examples, the file deletion process can occur in real-time, and other timing for executing the file deletion(s) can also be used in other examples. Optionally, the catalog service computing device 107 can make a threshold determination that the file entry is associated with an active file that has not been deleted based on the delete attribute value in the file entry, and proceed directly to step 510.

In step 504, the catalog service computing device 107 determines whether the retrieved file entry is associated with the deleted snapshot. In one example, the determination in step 504 can be made based on a comparison of the sequence number of the deleted snapshot with the create and delete attribute values for the file entry.

In particular, the file entry can be determined to be associated with the deleted snapshot when the sequence number of the deleted snapshot is greater than the create attribute value and less than the delete attribute value. Other methods for determining whether the retrieved file entry is associated with the deleted snapshot can also be used in other examples. If the catalog service computing device 107 determines that the file entry is associated with the deleted snapshot, then the Yes branch is taken to step 506.

In step 506, the catalog service computing device 107 determines whether the retrieved file entry is associated with another active snapshot. In other words, the host computing device 102(1) determines whether the file or file version associated with the file entry is included in another snapshot and therefore cannot be deleted. The determination in step 506 can be based on the attribute values in the retrieved file entry correlated with the delete attribute values in the snapshot entries in the snapshot-mapping index 121.

In this example, the catalog service computing device 107 can determine that the file entry is associated with another active snapshot when the create attribute value is less than, and the delete attribute value is greater than, at least one sequence number associated with a snapshot entry in the snapshot-mapping index 121 that has a delete attribute value indicating that the associated snapshot is active (or not yet deleted). Other methods for determining whether the file entry corresponds to a file or file version associated with another active snapshot can also be used in other examples. If the catalog service computing device 107 determines in step 506 that the file entry does not correspond to a file or file version associated with another active snapshot, then the No branch is taken to step 508.

In step 508, the catalog service computing device 107 marks the file or file version for a subsequent reclamation process or performing a deletion from the cloud storage device(s) 113, for example. The catalog service computing device 107 also can remove the file entry from the object-mapping index 123 and/or perform another type of clean-up of the metadata of the file. Subsequent to marking or deleting the file or file version, or if the catalog service computing device 107 determines in step 504 that the file entry is not associated with the deleted snapshot and the No branch is taken from step 504, or in step 506 that the file entry is associated with another active snapshot and the Yes branch is taken from step 506, then the catalog service computing device 107 proceeds to step 510.

In step 510, the catalog service computing device 107 determines whether there are any additional file entries in the object-mapping index 123 that have not yet been processed. If the catalog service computing device 107 determines that there is at least one additional file entry, then the Yes branch is taken back to step 502. However, if the catalog service computing device 107 determines that there are no more file entries, then the No branch is taken and the process ends. Accordingly, subsequent to processing the snapshot deletion in step 314 of FIG. 3, as described and illustrated earlier with reference to FIG. 5, or if the catalog service computing device 107 determines in step 312 that a snapshot has not been deleted and the No branch is taken, then the catalog service computing device 107 proceeds back to step 300 in this example. One or more of steps 300-314 can be performed in parallel or in a different order in other examples.

Figure 6:
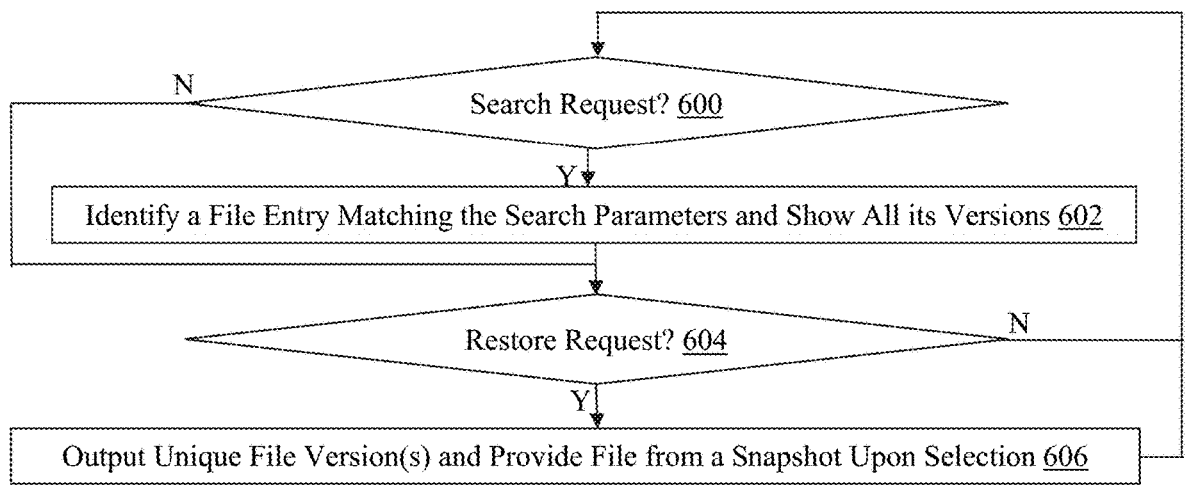
FIG. 6 is a flowchart of an exemplary method for facilitating file search and restore functionality.

Referring more specifically to FIG. 6, a flowchart illustrating an exemplary method for facilitating file search and restore functionality is illustrated.

In step 600 in this example, the catalog service module 214 of the catalog service computing device 107 determines whether a search request has been received, such as via a provided graphical user interface (GUI), for example. The search request can include parameters such as file name, file path or other pattern, for example, although other types of parameters can also be included in the search request. If the catalog service computing device 107 determines that a search request has been received, then the Yes branch is taken to step 602.

In step 602, the catalog service module 214 of the catalog service computing device 107 identifies a file entry in the object-mapping index 123 that matches the search parameters and provide an indication of all of its versions optionally via the provided GUI. Optionally, the catalog service computing device 107 can indicate a current version based a version of the file that has a set current version flag.

The catalog service computing device 107 then uses the contents of the file entry (e.g., the file path) to obtain a selected one of the versions of the file (e.g., from the cloud storage device(s) 113) and returns the file version, or a link thereto, in response to the search request. Other methods for identifying file(s) responsive to a search request can also be used in other examples. Subsequent to identifying the file entry, and responding to the search request, or if the catalog service computing device 107 determines in step 600 that a search request has not been received and the No branch is taken, then the catalog service computing device 107 proceeds to step 604.

In step 604, the catalog service module 214 of the catalog service computing device 107 determines whether a restore request has been received. In this example, the restore request can be received via a provided GUI based on a selection of a unique identifier for a particular file, although the restore request can initiated in other ways and can be for any number of files in other examples. If the catalog service computing device 107 determines that a restore request has been received, then the Yes branch is taken to step 606.

In step 606, the catalog service module 214 of the catalog service computing device 107 outputs (e.g., via the provided GUI) unique file version(s) and provides the requested file from a snapshot in response to a selection of one of the file version(s). All of the version(s) of a file are obtained based on the file path, inode, and/or create time attribute metadata in the associated file entries in the object-mapping index 123. In one example, file "f.txt" has three versions having associated file entries as follows:

| | |
|---|---|
| f.txt V1 | snapshotCreateSequence = 0 |
| | snapshotDeleteSequence = 7 |
| | isLatest = N |
| f.txt V2 | snapshotCreateSequence = 7 |
| | snapshotDeleteSequence = 12 |
| | isLatest = N |
| f.txt V3 | snapshotCreateSequence = 12 |
| | snapshotDeleteSequence = −1 |
| | IsLatest = Y |

In this example, V1 of the "f.txt" file is present from snapshot 0 to snapshot 6, V2 is present from snapshot 7 to snapshot 11, and V3 is the current version of the file. For each file version, the snapshot creation time, which can be stored in the snapshot-mapping index 121, for example, corresponds with the backup time. For example, the backup time of V3 is the snapshot creation time of snapshot with sequence number "12".

Upon receiving a selection of a specific version of the file to restore, the file is retrieved from the snapshot having the newest or most recent sequence number in which the file is present. For example, upon receiving a selection of V2 for restore in the above example, the host computing device 102(1) retrieves the file from the snapshot associated with sequence number "11" that is maintained on the cloud storage device(2) 113, for example.

Subsequent to providing the file in response to the restore request and selection, or if the catalog service computing device 107 determines in step 606 that a restore request has not been received and the No branch is taken, then the catalog service computing device 107 proceeds back to step 600. Additionally, one or more of steps 600-606 can be performed in parallel or in a different order in other examples.

In other examples, this technology includes means for incrementing a sequence number and generating an entry for a snapshot associated with obtained metadata for the snapshot. The snapshot entry includes a snapshot identifier for the snapshot and the incremented sequence number. Means for setting a current version flag in another entry for a file associated with a create event identified in the metadata are also provided. The file entry further includes a file identifier for the file, a create attribute comprising the incremented sequence number, and a delete attribute. Additionally, this technology includes means for inserting the file and snapshot entries into one or more indices in a catalog database to facilitate file search and restoration.

In this example, the disclosed technology can also include means for setting the delete attribute based on another sequence number for another snapshot. The other snapshot is associated with other obtained metadata for the other snapshot. Further, means for inserting a new entry for the file into one of the indices are also provided. The new entry includes the file identifier, another create attribute including the other sequence number, and another delete attribute. Even further, this technology can include means for identifying the file entry in one or more of the indices based on the set current version flag, in response to a received search request that includes the file identifier.

With this technology, snapshot and file metadata is more efficiently and effectively cataloged to facilitate improved search and restore functionality, among other capabilities, particularly for relatively large volumes maintained on backup storage tiers. Storage volumes are cataloged using an optimized schema to provide scalable full path global file search and restore functionality. Accordingly, this technology advantageously utilizes fewer resources to catalog backup storage volumes and to process search and restore requests using the backup catalog.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method, comprising:
    incrementing, by a computing device, a stored sequence number associated with a storage volume after receipt of metadata for a first snapshot generated for the storage volume, wherein the snapshot metadata comprises a snapshot identifier;
    generating, by the computing device, a snapshot entry for the first snapshot in a stored snapshot-mapping index, wherein the snapshot entry comprises the snapshot identifier and the incremented sequence number;
    setting, by the computing device, a first current version flag in a first file entry of a stored object-mapping index for a file associated with a modify event identified in the snapshot metadata, wherein the first file entry further comprises a file identifier for the file and a first create attribute comprising the incremented sequence number;
    resetting, by the computing device, a second current version flag in a second file entry of the stored object-mapping index for the file, wherein the second file entry further comprises the file identifier and a first delete attribute comprising the incremented sequence number; and
    returning, by the computing device, in response to a received selection from a prior version of the file associated with the second file entry and a current version of the file, the file retrieved from the first snapshot, wherein the first snapshot is identified based on the first create attribute and the snapshot identifier in the snapshot entry.

2. The method of claim 1, wherein the first file entry further comprises a second delete attribute that comprises a default value upon creation of the first file entry.

3. The method of claim 1, wherein other metadata for a second snapshot generated for the storage volume comprises a file delete event associated with the file and the method further comprises setting, by the computing device, the second delete attribute based on another sequence number associated with the second snapshot.

4. The method of claim 1, further comprising outputting, by the computing device, via a graphical user interface and in response to a received request, an indication of each of the prior and current versions of the file for selection.

5. The method of claim 1, wherein other snapshot metadata comprises a file create event for the file and the method further comprises setting, by the computing device, the second current version flag.

6. The method of claim 1, wherein the second file entry comprises a second create attribute comprising another sequence number that is less than the incremented sequent number.

7. A non-transitory machine readable medium having stored thereon instructions for scalable file backup catalogs, the instructions comprising machine executable code that, when executed by at least one machine, causes the machine to:
    increment a stored sequence number associated with a storage volume after receipt of metadata for a first snapshot generated for the storage volume, wherein the snapshot metadata comprises a snapshot identifier;

generate a snapshot entry for the first snapshot in a stored snapshot-mapping index, wherein the snapshot entry comprises the snapshot identifier and the incremented sequence number;

set a first current version flag in a first file entry of a stored object-mapping index for a file associated with a modify event identified in the snapshot metadata, wherein the first file entry further comprises a file identifier for the file and a first create attribute comprising the incremented sequence number;

reset a second current version flag in a second file entry of the stored object-mapping index for the file, wherein the second file entry further comprises the file identifier and a first delete attribute comprising the incremented sequence number; and return in response to a received selection from a prior version of the file associated with the second file entry and a current version of the file, the file retrieved from the first snapshot, wherein the first snapshot is identified based on the first create attribute and the snapshot identifier in the snapshot entry.

8. The non-transitory machine readable medium of claim 7, wherein the first file entry further comprises a second delete attribute that comprises a default value upon creation of the first file entry.

9. The non-transitory machine readable medium of claim 7, wherein other metadata for a second snapshot generated for the storage volume comprises a file delete event associated with the file and the machine executable code, when executed by the machine, further causes the machine to set the second delete attribute based on another sequence number associated with the second snapshot.

10. The non-transitory machine readable medium of claim 7, wherein the machine executable code, when executed by the machine, further causes the machine to output, via a graphical user interface and in response to a received request, an indication of each of the prior and current versions of the file for selection.

11. The non-transitory machine readable medium of claim 7, wherein other snapshot metadata comprises a file create event for the file and the machine executable code, when executed by the machine, further causes the machine to set the second current version flag.

12. The non-transitory machine readable medium of claim 7, wherein the second file entry comprises a second create attribute comprising another sequence number that is less than the incremented sequent number.

13. A computing device, comprising:
a memory containing machine readable medium comprising machine executable code having stored thereon instructions for scalable file backup catalogs; and
a processor coupled to the memory, the processor configured to execute the machine executable code to cause the processor to:
increment a stored sequence number associated with a storage volume after receipt of metadata for a first snapshot generated for the storage volume, wherein the snapshot metadata comprises a snapshot identifier;
generate a snapshot entry for the first snapshot in a stored snapshot-mapping index, wherein the snapshot entry comprises the snapshot identifier and the incremented sequence number;

set a first current version flag in a first file entry of a stored object-mapping index for a file associated with a modify event identified in the snapshot metadata, wherein the first file entry further comprises a file identifier for the file and a first create attribute comprising the incremented sequence number;

reset a second current version flag in a second file entry of the stored object-mapping index for the file, wherein the second file entry further comprises the file identifier and a first delete attribute comprising the incremented sequence number; and return in response to a received selection from a prior version of the file associated with the second file entry and a current version of the file, the file retrieved from the first snapshot, wherein the first snapshot is identified based on the first create attribute and the snapshot identifier in the snapshot entry.

14. The computing device of claim 13, wherein the first file entry further comprises a second delete attribute that comprises a default value upon creation of the first file entry.

15. The computing device of claim 13, wherein other metadata for a second snapshot generated for the storage volume comprises a file delete event associated with the file and the processor is further configured to execute the machine executable code to further cause the processor to set the second delete attribute based on another sequence number associated with the second snapshot.

16. The computing device of claim 13, wherein the processor is further configured to execute the machine executable code to further cause the processor to output, via a graphical user interface and in response to a received request, an indication of each of the prior and current versions of the file for selection.

17. The computing device of claim 13, wherein other snapshot metadata comprises a file create event for the file and the processor is further configured to execute the machine executable code to further cause the processor to set the second current version flag.

18. The computing device of claim 13, wherein the second file entry comprises a second create attribute comprising another sequence number that is less than the incremented sequent number.

19. The computing device of claim 18, wherein the processor is further configured to execute the machine executable code to further cause the processor to identify a plurality of file entries in the object-mapping index for the file in response to a received search request comprising one or more parameters for the file, wherein each of the plurality of file entries corresponds to one of a plurality of versions of the file.

20. The computing device of claim 13, wherein the processor is further configured to execute the machine executable code to further cause the processor to return the file in response to a received restore request comprising the file identifier, wherein the first snapshot is associated with a most recent sequence number in which the file is present.

* * * * *